(12) United States Patent
Matsuda et al.

(10) Patent No.: US 9,821,605 B2
(45) Date of Patent: Nov. 21, 2017

(54) PNEUMATIC TIRE WITH CORD LAYER EXTENDING CLOSE TO TIRE OUTER SURFACE

(71) Applicants: Jun Matsuda, Hiratsuka (JP); Yoshiaki Hashimura, Hiratsuka (JP)

(72) Inventors: Jun Matsuda, Hiratsuka (JP); Yoshiaki Hashimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/758,413

(22) Filed: Feb. 4, 2013

(65) Prior Publication Data
US 2014/0041780 A1 Feb. 13, 2014

Related U.S. Application Data

(62) Division of application No. 12/094,712, filed as application No. PCT/JP2006/323132 on Nov. 20, 2006, now Pat. No. 8,365,787.

(30) Foreign Application Priority Data

Jan. 20, 2006 (JP) ................................. 2006-012414
Jan. 20, 2006 (JP) ................................. 2006-012438

(51) Int. Cl.
*B60C 15/00* (2006.01)
*B60C 9/02* (2006.01)
(Continued)

(52) U.S. Cl.
CPC .............. *B60C 5/14* (2013.01); *B60C 9/0207* (2013.01); *B60C 9/09* (2013.01); *B60C 9/26* (2013.01);
(Continued)

(58) Field of Classification Search
CPC .......... B60C 15/0018; B60C 2019/008; B60C 15/0009; B60C 15/00; B60C 9/0207;
(Continued)

(56) References Cited

U.S. PATENT DOCUMENTS 1,211,035 A * 1/1917 Archer ...................... 152/550 X
1,682,922 A * 9/1928 McKone ................... 152/543 X
(Continued)

FOREIGN PATENT DOCUMENTS

DE      23 62 902 A1 *  6/1975
DE      29 22 651 A1 * 12/1980
(Continued)

OTHER PUBLICATIONS online definition of "overlap", Webster's Third New International Dictionary, Unabridged, Merriam-Webster, Inc., 1993.*
(Continued)

*Primary Examiner* — Adrienne C Johnstone
(74) *Attorney, Agent, or Firm* — Greer Burns & Crain, Ltd.

(57) ABSTRACT

A pneumatic tire includes: an air permeation preventive layer disposed in the inner surface of the tire; a belt layer buried in a tread part; and a cord layer formed by arranging a plurality of cords. The cord layer is disposed between the air permeation preventive layer and the belt layer, and extends to a bead part side further from a tire maximum width position. At least a part of the cord layer is located close to the outer surface of the tire, at a position closer to the bead part side than the tire maximum width position, so that the distance between the cords and the outer surface of the tire is not more than 2 mm.

6 Claims, 6 Drawing Sheets

(51) Int. Cl.
  *B60C 13/00* (2006.01)
  *B60C 5/14* (2006.01)
  *B60C 9/09* (2006.01)
  *B60C 9/26* (2006.01)
  B60C 19/00 (2006.01)
  B60C 9/18 (2006.01)

(52) U.S. Cl.
  CPC .. *B60C 15/0018* (2013.01); *B60C 2009/1864* (2013.01); *B60C 2015/009* (2013.01); *B60C 2019/008* (2013.01); *Y10T 152/10864* (2015.01)

(58) Field of Classification Search
  CPC .... B29D 2030/1671; B29D 2030/3071; Y10T 152/10828; Y10T 152/10837; Y10T 152/10864
  USPC ....... 152/552, 554, 550, 450, 543, 546, 555; 156/87
  See application file for complete search history.

(56) References Cited

U.S. PATENT DOCUMENTS

| | | | |
|---|---|---|---|
| 2,268,249 A * | 12/1941 | Goodrich | |
| 2,587,428 A * | 2/1952 | Antonson | |
| 2,902,073 A * | 9/1959 | Lessig | 152/543 X |
| 2,979,101 A * | 4/1961 | Willis | 152/543 |
| 3,024,827 A * | 3/1962 | Hough | |
| 3,245,455 A | 4/1966 | Lewis | |
| 3,770,041 A * | 11/1973 | Abbott | |
| 3,835,907 A * | 9/1974 | Bishton | 152/450 X |
| 4,249,587 A | 2/1981 | Duttlinger | |
| 4,338,989 A * | 7/1982 | Sperberg | B60C 15/0018 |
| 4,418,736 A | 12/1983 | Vandenburgh | |
| 5,056,575 A | 10/1991 | Yamaguchi et al. | |
| 5,277,236 A * | 1/1994 | Takatsu | |
| 5,433,257 A | 7/1995 | Yamaguchi et al. | |
| 6,568,446 B1 | 5/2003 | Schulte | |
| 6,752,186 B1 * | 6/2004 | Ueyoko | 152/552 X |
| 7,213,627 B2 * | 5/2007 | Matsunami | 152/550 X |
| 7,416,002 B2 * | 8/2008 | Yu | 152/550 X |
| 7,740,038 B2 * | 6/2010 | Matsunaga | 152/550 X |
| 2003/0173013 A1 * | 9/2003 | Idei | 152/550 X |
| 2007/0056671 A1 | 3/2007 | Klapp | |

FOREIGN PATENT DOCUMENTS

| | | | |
|---|---|---|---|
| DE | 30 14 268 A1 * | 10/1981 | |
| EP | 0 393 912 A2 * | 10/1990 | |
| GB | 1050004 | 12/1966 | |
| JP | 62-155007 U | 10/1987 | |
| JP | 1-111504 | 4/1989 | |
| JP | 1-99702 U | 7/1989 | |
| JP | 2-68203 | 3/1990 | |
| JP | 2-267012 | 10/1990 | |
| JP | 08002218 A * | 1/1996 | |
| JP | 10035228 A * | 2/1998 | |
| JP | 10-230706 | 9/1998 | |
| JP | 2000-198318 | 7/2000 | |
| JP | 2000211317 A * | 8/2000 | |
| JP | 2001071714 A * | 3/2001 | |
| JP | 2001-301412 | 10/2001 | |
| JP | 2003-80905 | 3/2003 | |
| JP | 2003-165307 | 6/2003 | |
| JP | 2004-82816 | 3/2004 | |
| JP | 2005-186829 | 7/2005 | |

OTHER PUBLICATIONS

English machine translation of Japanese Patent Application 2003-80905 A, Mar. 19, 2003.*
online definition of "fold", Collins English Dictionary—Complete and Unabridged, HarperCollins Publishers, 2003.*

* cited by examiner

Fig.7

Variant embodiment of Fig. 3 wherein the cord layer 8 is designed to overlap only the end portions of the belt layers 7 so that the cord layer 8 is arranged on each of the end portions of the belt layers 7, and the overlapping width in the axial direction of the tire of each cord layer 8 and the belt layers 7 is at least 10 mm from the corresponding end portion of the belt layers.

PNEUMATIC TIRE WITH CORD LAYER EXTENDING CLOSE TO TIRE OUTER SURFACE

This is a divisional of application Ser. No. 12/094,712, filed May 22, 2008, now U.S. Pat. No. 8,365,787, issued Feb. 5, 2013, which is a U.S. National Phase Application under 35 USC 371, of International Application No. PCT/JP2006/323132, filed Nov. 20, 2006.

TECHNICAL FIELD

The present invention relates to a pneumatic tire having a belt layer buried in a tread part thereof. More particularly, the present invention relates to a pneumatic tire with a durability improved by preventing the oxidation degradation of a belt layer.

BACKGROUND ART

There are factors adversely affecting the durability of a pneumatic tire having a belt layer buried in a tread part thereof. Such factors include separation of a cord and a coating rubber in both end portions, in the axial direction of the tire, of the belt layer. In particular, deterioration of the belt layer makes the separation of the cord and the coating rubber likely to occur. It has been pointed out that, in a process where air inside the tire permeates to the outside of the tire, oxygen in the air oxidizes the coating rubber of the belt layer, thus accelerating such deterioration of the belt layer.

In this respect, the following configuration for a pneumatic tire has been proposed. Specifically, a cord reinforcing layer is prepared by arranging multiple cords in the axial direction of the tire, and is buried in a buttress part of the pneumatic tire. In addition, the cord reinforcing layer includes a belt-inner-side part, an extending part, and a close part. The belt-inner-side part extends in a region below the belt layer. The extending part extends outward in the axial direction of the tire, and the close part is located close to the outer surface of the tire. With this configuration, air moving inside the tire is guided to the outside of the tire by using the cord reinforcing layer, so that a large amount of oxygen is prevented from passing through the vicinity of each end portion of the belt layer. As a result, the oxidation degradation of the coating rubber of the belt layer is suppressed (see, for example, Patent Document 1).

However, the following problem arises in the above-described pneumatic tire in which a cord reinforcing layer prepared by arranging multiple cords is buried in a buttress part thereof, and in which the end portion of the cord reinforcing layer is located close to the outer surface of the tire. Specifically, the buttress part is relatively frequently brought into contact with water at the time of running on a wet road surface. For this reason, if the end portion of the cord reinforcing layer is located close to the outer surface of the tire in the vicinity of the buttress part, water is fed to the belt layer via the cord reinforcing layer. In this event, the water accelerates deterioration of the belt cords, eventually leading to a reduction in the durability of the pneumatic tire. Moreover, the buttress part is deformed by a relatively large amount at the running of the tire. For this reason, if the end portion of the cord reinforcing layer is located close to the outer surface of the tire, damage is likely to originate at the close part, resulting in a cause of a reduction in the durability of the pneumatic tire as well. In other words, even if the oxidation degradation of the belt layer is prevented by using the cord reinforcing layer, an effect of improving the durability of the pneumatic tire cannot be sufficiently obtained.

Patent Document 1: Japanese Patent Application Kokai Publication No. 2003-80905

DISCLOSURE OF THE INVENTION

An object of the present invention is to provide a pneumatic tire with a durability improved by preventing the oxidation degradation of a belt layer.

A pneumatic tire according to the present invention (a first invention) for achieving the above object has the following characteristics. The pneumatic tire includes: an air permeation preventive layer disposed in the inner surface of the tire; a belt layer buried in a tread part; and a cord layer formed by arranging a plurality of cords. The cord layer is disposed between the air permeation preventive layer and the belt layer, and extends to a bead part side further from a tire maximum width position. At least a part of the cord layer is located, close to the outer surface of the tire, at a position closer to the bead part side than the tire maximum width position, so that the distance between the cords and the outer surface of the tire is not more than 2 mm.

In the first invention, the cord layer is disposed between the air permeation preventive layer and the belt layer, and at least a part of the cord layer is located close to the outer surface of the tire. Accordingly, in a process where air inside the tire permeates to the outside of the tire, air moving toward the belt layer is taken in the cords of the cord layer. The air can thus be discharged to the outside of the tire from the part located close to the outer surface of the tire. This structure makes it possible to reduce the amount of oxygen passing through the belt layer, and thus to suppress the oxidation degradation of the belt layer. In this manner, the durability of the pneumatic tire can be improved.

Moreover, at least the part of the cord layer is located close to the outer surface of the tire at the position closer to the bead part side than the tire maximum width position. For this reason, it is possible to prevent the cord layer itself from becoming a cause of reduction in the durability. Specifically, consider the case where the part, located close to the outer surface of the tire, of the cord layer is disposed at the position close to the bead part. This disposition makes water unlikely to penetrate into the cord layer during the running of the tire on a wet road surface. Accordingly, water is prevented from being fed to the belt layer through the cord layer. In addition, the part closer to the bead part side than the tire maximum width position in the pneumatic tire has a relatively small amount of deformation occurring during the running of the tire. For this reason, when the part, located close to the outer surface of the tire, of the cord layer is disposed at the position close to the bead part, it is possible to make damage originating at the close part unlikely to occur. As a result, the effect of improving the durability using the cord layer can be taken advantage of to the maximum extent.

Note that, the cord layer guides, to the outside of the tire, only air having passed through the air permeation preventive layer. Since the performance of the pneumatic tire in maintaining the internal pressure is secured based on the air permeation preventive layer, the cord layer does not cause the performance of the pneumatic tire in maintaining the internal pressure to be reduced.

In the first invention, it is preferable that at least a part of the cord layer be located close to the outer surface of the tire, at a height in a range from 0.1 H to 0.5 H, from a bead heel, in the radial direction of the tire, with respect to the cross-sectional height H of the tire, so that the distance between the cords and the outer surface of the tire is not more than 2 mm. This makes it possible to more securely obtain the effect of improving the durability.

It is preferable a carcass layer laid between a pair of bead parts be used as the cord layer. The cord layer may be one different from the carcass layer, but it is desirable that the overlapping width, in the axial direction of the tire, of the cord layer and the belt layer be at least 10 mm from the end portion of the belt layer. This makes it possible to securely protect the vicinity, where separation failure is likely to occur, of the end portion of the belt layer. Note that, if the end portion of the cord layer is disposed in the region below the belt layer, the end portion becomes a factor of a failure. For this reason, it is favorable that the end portion of the cord layer is not disposed in the region below the belt layer.

On the other hand, a pneumatic tire according to the present invention (a second invention) for achieving the above-described object has the following characteristics. Specifically, the pneumatic tire includes: a carcass layer laid between a pair of bead parts; a belt layer buried on the outer circumferential side of the carcass layer in a tread part; and a cord layer formed by arranging cords in parallel. In addition, an inner part of the cord layer is disposed between the carcass layer and the belt layer. An outer part of the cord layer is disposed on the outer circumferential side of the belt layer, along the belt layer. Moreover, each cord of the cord layer is continuously extended, in a straddling manner, between the inner and outer parts.

In the second invention, the cord layer is disposed to sandwich the belt layer from the inner side and the outer side of the belt layer in the radial direction of the tire. In addition, the cords of the cord layer are extended continuously between the inner part and the outer part in the straddling manner. Accordingly, in a process where air inside the tire permeates to the outside of the tire, air moving toward the belt layer is taken in the cords of the cord layer before entering the belt layer. The air thereby can be bypassed to the outer circumferential side of the belt layer. This structure makes it possible to reduce the amount of air passing through the belt layer, and thus to suppress the oxidation degradation of the belt layer. In this manner, the durability of the pneumatic tire can be improved.

Moreover, the inner part of the cord layer is disposed between the carcass layer and the belt layer, while the outer part of the cord layer is disposed on the outer circumferential side of the belt layer, along the belt layer. Accordingly, it is possible to prevent the cord layer itself from becoming a cause of reduction in the durability. Specifically, the end portion of each of the inner part and the outer part of the cord layer is disposed at a position with a small amount of deformation occurring. Accordingly, damage originating at the end portions of the cord layer is unlikely to occur. As a result, the effect of improving the durability using the cord layer can be taken advantage of to the maximum extent.

In the second invention, it is preferable that the end portion of each of the inner and outer parts of the cord layer be disposed in a range from 10 mm to 40 mm, from an edge part of the belt layer with the widest width toward a tread center side. This makes it possible to sufficiently obtain the effect of suppressing the oxidation degradation of the belt layer while suppressing an increase in the weight.

In addition, it is preferable that the outer part of the cord layer be extended so as to overlap a groove formed in the tread part. This allows air bypassed by the cord layer to be discharged to the outside of the tire from the groove portion. In this case, it is preferable that the relation between a tread gauge (A) and a groove-bottom gauge (B) at the position of the groove be $0.03 \leq B/A \leq 0.5$. Here, the tread gauge (A) is a gauge from the tread surface to the cords of the cord layer, while the groove-bottom gauge (B) is a gauge from the bottom of the groove to the cords of the cord layer. Specifically, it is preferable to reduce the groove-bottom gauge (B) relative to the tread gauge (A) for the air discharge. However, when the groove-bottom gauge is excessively reduced, cracking becomes likely to occur in the bottom of the groove. For this reason, when the above relation is satisfied, air bypassed by the cord layer can be effectively discharged to the outside of the tire while an occurrence of cracking in the bottom of the groove is avoided.

As each cord of the cord layer, an organic fiber cord or a metal cord may be used. In any case, it is preferable that each cord be a cord formed by twisting three or more strands in order to ensure the ventilation in the cords.

BRIEF DESCRIPTION OF THE DRAWINGS

FIG. 7 is a block diagram of the variant embodiment of FIG. 3 wherein the cord layer 8 is designed to overlap only the end portions of the belt layers 7 so that the cord layer 8 is arranged on each of the end portions of the belt layers 7, and the overlapping width in the axial direction of the tire of each cord layer 8 and the belt layers 7 is at least 10 mm from the corresponding end portion of the belt layers 7.

BEST MODES FOR CARRYING OUT THE INVENTION

Hereinafter, the configuration of the present invention will be described in detail with reference to the accompanying drawings.

Figure 1:
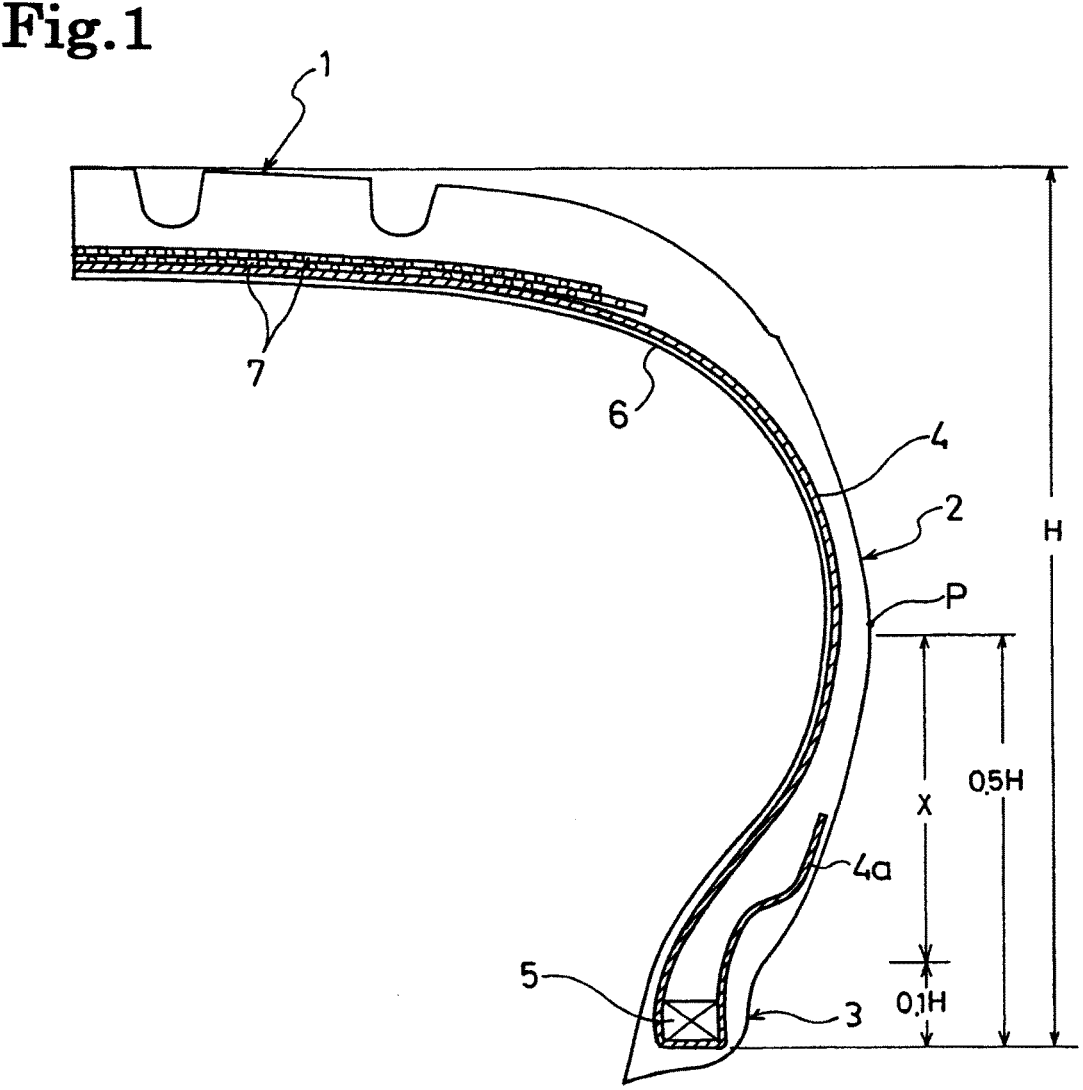
FIG. 1 is a meridian half cross-sectional view showing a pneumatic tire according to an embodiment of a first invention.

FIG. 1 shows a pneumatic tire according to an embodiment of a first invention. In FIG. 1, reference numeral 1 denotes a tread part, reference numeral 2 denotes sidewall parts, and reference numeral 3 denotes bead parts. A carcass layer 4 is laid between the pair of left and right bead parts 3 and 3. Each of the end portions of the carcass layer 4 is folded back around a bead core 5 from the inner side of the tire to the outer side thereof. The carcass layer 4 is formed of multiple carcass cords arranged in the radial direction of the tire. As the carcass cords, organic fiber cords made of nylon, polyester, or the like, or steel cords may be used. An air permeation preventive layer 6 is disposed on the inner side of the carcass layer 4, in the inner surface of the tire. The air permeation preventive layer 6 (inner liner layer) may be formed of a rubber composition primarily composed of polyisobutylene isoprene rubber. Alternatively, the air permeation preventive layer 6 may be formed of a thermoplastic resin, or a composite resin material obtained by dispersing an elastomer in a thermoplastic resin. Moreover, multiple belt layers 7 are disposed on the outer circumferential side of the carcass layer 4, in the tread part 1, and over the entire circumference of the tire. These belt layers 7 include reinforcing cords each inclined to the circumferential direction of the tire, and are also disposed in such a manner that each reinforcing cord of one of the belt layers 7 intersect each reinforcing cord of an adjacent one of the belt layers 7.

Figure 2:
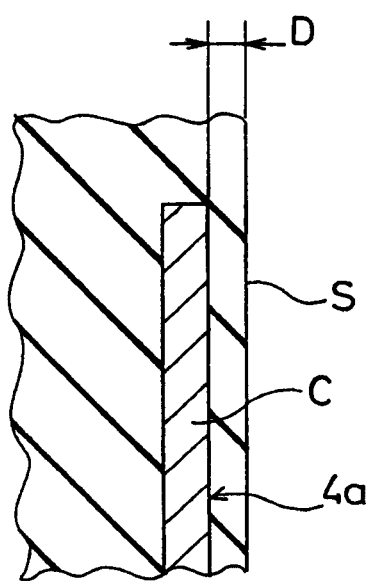
FIG. 2 is a cross-sectional view showing a chief part of the pneumatic tire of FIG. 1.

In the above-described pneumatic tire, the carcass layer 4 supports a function of maintaining the internal pressure of the tire, and concurrently functions as a cord layer for preventing the oxidation degradation of the belt layers 7. Specifically, the carcass layer 4 is disposed between the air permeation preventive layer 6 and the belt layers 7, and extends from a region below the belt layers 7 to each bead part 3 side further from the tire maximum width position P (a position at which a cross-sectional width of the tire is the maximum). In addition, as shown in the enlarged view of FIG. 2, at least a part of the carcass layer 4 is located close to the outer surface of the tire so that the distance D between the cords C and the outer surface S of the tire is not more than 2 mm. Here, the part is disposed at a position, closer to the bead part 3 side than the tire maximum width position P of the tire, and at a height in a range X from 0.1 H to 0.5 H, from the bead heel, in the radial direction of the tire, with respect to the cross-sectional height H of the tire. In this embodiment, a folded-back part 4a of the carcass layer 4 is curved at the middle thereof toward the outer surface of the tire, so that the end portion of the folded-back part 4a is located locally close to the outer surface of the tire. It should be noted that the folded-back part 4a of the carcass layer 4 may be folded back to linearly extend from the inner edge of the bead core 5 toward the outer surface of the tire, so that a large part of the folded-back part 4a is located close to the outer surface of the tire.

In the above-described pneumatic tire, the carcass layer 4 is disposed between the air permeation preventive layer 6 and the belt layers 7, and at least a part of the carcass layer 4 is located close to the outer surface of the tire. Accordingly, in a process where air inside the tire permeates to the outside of the tire due to the difference in pressure between the inside and the outside of the tire, air moving toward the belt layers 7 is taken in the cords of the carcass layer 4. The air can thus be discharged to the outside of the tire from the part located close to the outer surface of the tire. This structure makes it possible to reduce the amount of oxygen passing through the belt layers 7, and thus to suppress the oxidation degradation of the coating rubber of the belt layers 7. In this manner, the durability of the pneumatic tire can be improved.

Moreover, the part, which is located close to the outer surface of the tire, of the carcass layer 4 is disposed at the position closer to the bead part 3 side than the tire maximum width position P. For this reason, the durability can be prevented from being reduced due to the structure of the carcass layer 4. Specifically, consider the case where the part, located close to the outer surface of the tire, of the carcass layer 4 is disposed at the position closer to the bead part 3 side than the tire maximum width position P. In this case, water is unlikely to penetrate into the carcass layer 4 during the running on a wet road surface. Accordingly, water is prevented from being fed to the belt layers 7 through the carcass layer 4. In addition, this disposition prevents an occurrence of damage, such as a sidewall blowout, which would otherwise originating at the close part located close to the outer surface of the tire due to deformation during the running of the tire.

In particular, when a part of the carcass layer 4 is located close to the outer surface of the tire, it is preferable that the part be disposed at a position of the height in the range X from 0.1 H to 0.5 H, from the bead heel, in the radial direction of the tire, with respect to the cross-sectional height H of the tire. When the part, located close to the outer surface of the tire, of the carcass layer 4 exists at a position of a height of less than 0.1 H from the bead heel, the part is brought into contact with the rim flange to be worn down, thus becoming a cause of a failure. On the other hand, when the part exists at a position of a height more than 0.5 H from the bead heel, water is likely to enter from the part, and concurrently a failure is likely to occur from the part. The most preferable range X is in a range from 0.1 H to 0.4 H.

In the part, located close to the outer surface of the tire, of the carcass layer 4, the distance between the cords and the outer surface of the tire is set at not more than 2 mm. When the distance D of the cord layer is more than 2 mm, air guided into the cords is unlikely to be discharged to the outside of the tire. The cords of the cord layer may be exposed on the outer surface of the tire. In this case, the distance D is 0 mm.

In the above-described embodiment, the carcass layer laid between the pair of bead parts serves also as the cord layer. As the carcass layer serving also as the cord layer, it is possible to employ one folded back around the bead core from the inner side of the tire to the outer side thereof, or one extending from the tread part to each bead part without being wound around the bead core.

Figure 3:
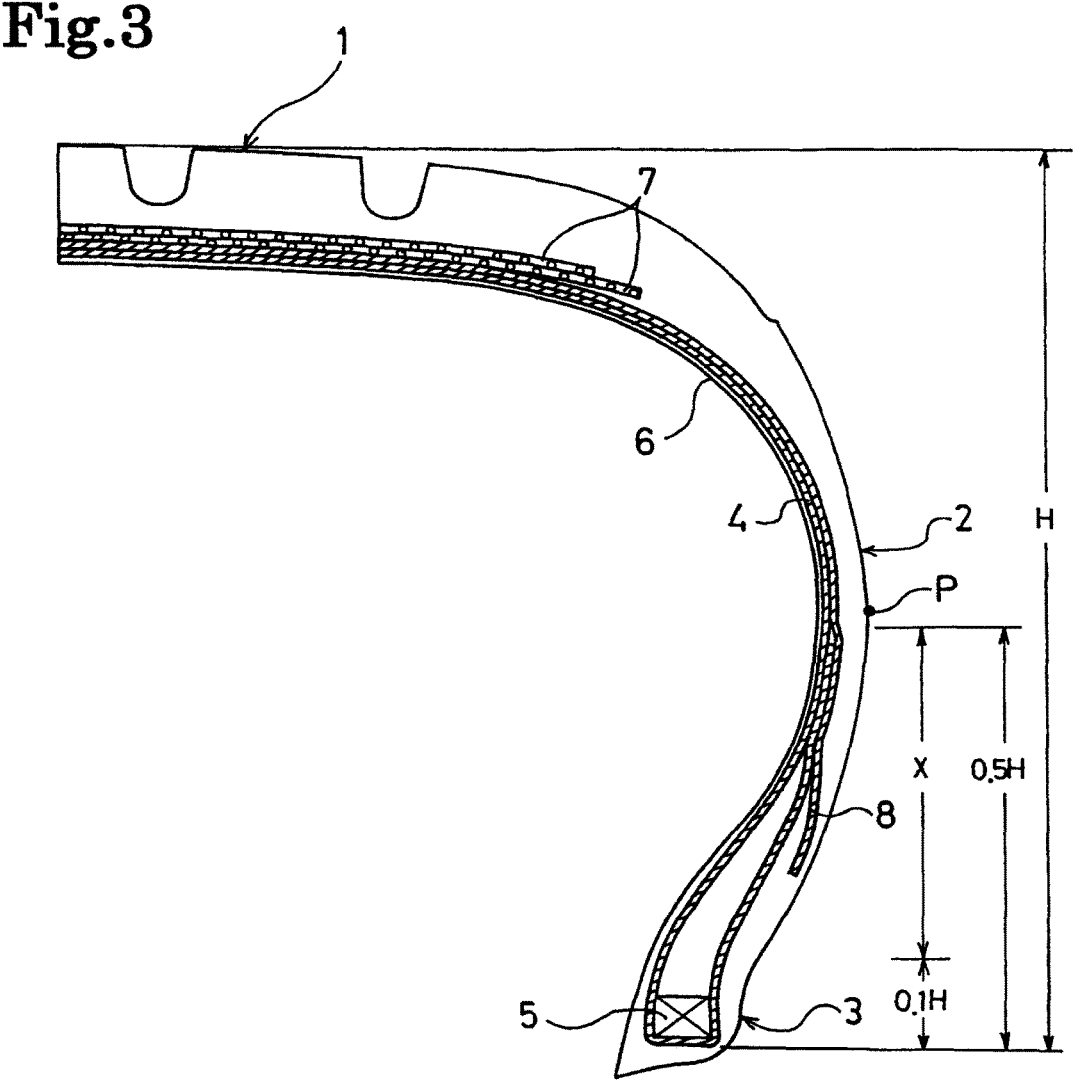
FIG. 3 is a meridian half cross-sectional view showing a pneumatic tire according to another embodiment of the first invention.

FIG. 3 shows a pneumatic tire according to another embodiment of the first invention. This embodiment uses a cord layer that is different from the carcass layer. Accordingly, in FIG. 3, the same components as those in FIG. 1 are denoted by the same reference numerals, and will not be described in detail.

As shown in FIG. 3, a cord layer 8 is disposed between the air permeation preventive layer 6 and the belt layers 7, and along the carcass layer 4. The cord layer 8 is formed by arranging a plurality of cords. The air permeation preventive layer 6 is disposed in the inner surface of the tire, while the belt layers 7 are buried in the tread part 1. The cord angle of the cord layer 8 with respect to the circumferential direction of the tire is not particularly limited, but may be set, for example, in a range from 70° to 90°. As the cords of the cord layer 8, organic fiber cords made of nylon, polyester, or the like, or steel cords may be used. The cord layer 8 extends from a region below the belt layers 7 to each bead part side further from the tire maximum width position P. In addition, at least apart of the cord layer 8 is located close to the outer surface of the tire so that the distance between the cords and the outer surface of the tire is not more than 2 mm. Concurrently, the part is disposed at a position, closer to the bead part 3 side than the tire maximum width position P, and at a height in a range X from 0.1 H to 0.5 H, and more preferably from 0.1 H to 0.4 H, from the bead heel, in the radial direction of the tire, with respect to the cross-sectional height H of the tire.

FIG. 3 further shows a portion of the cord layer 8 in contact with the respective folded end portion of the carcass layer 4 radially inward of the tire maximum width position P, which is extended radially inwardly by a respective portion of the cord layer 8 which simultaneously extends closer to the outer surface of the tire and farther from the carcass layer 4, which is extended radially inwardly by the respective part of the cord layer located close to the outer surface of the tire.

In the above-described pneumatic tire, the same effect can be obtained as in the case of the first-mentioned pneumatic tire. Specifically, in a process where air inside the tire permeates to the outside of the tire due to the difference in pressure between the inside and the outside of the tire, air moving toward the belt layers 7 is taken in the cords of the cord layer 8. The air can thus be discharged to the outside of the tire from the part located close to the outer surface of the tire. This makes it possible to reduce the amount of oxygen passing through the belt layers 7, and thus to suppress the oxidation degradation of the coating rubber of the belt layers 7. In this manner, the durability of the pneumatic tire can be improved. Moreover, the part, located close to the outer surface of the tire, of the cord layer 8 is disposed at the position closer to the bead part 3 side than the tire maximum width position P. For this reason, the durability can be prevented from being reduced due to the structure of the cord layer 8.

In the above-described embodiment, the cord layer 8 extends over the belt layers 7, and thus does not have the end portions thereof in a region below the belt layers 7. Such structure having no end portion of the cord layer 8 in the region below the belt layers 7 is excellent in durability. However, it is also possible that the cord layer 8 is designed to overlap only the end portions of the belt layers 7, and that such cord layer 8 is then arranged on each of the end portions of the belt layers 7. In this case, it is desirable that the overlapping width, in the axial direction of the tire, of each cord layer 8 and the belt layers 7 be at least 10 mm from the corresponding end portion of the belt layers 7. This design makes it possible to securely protect the vicinity, where a separation failure is likely to occur, of each end portion of the belt layers 7.

Figure 4:
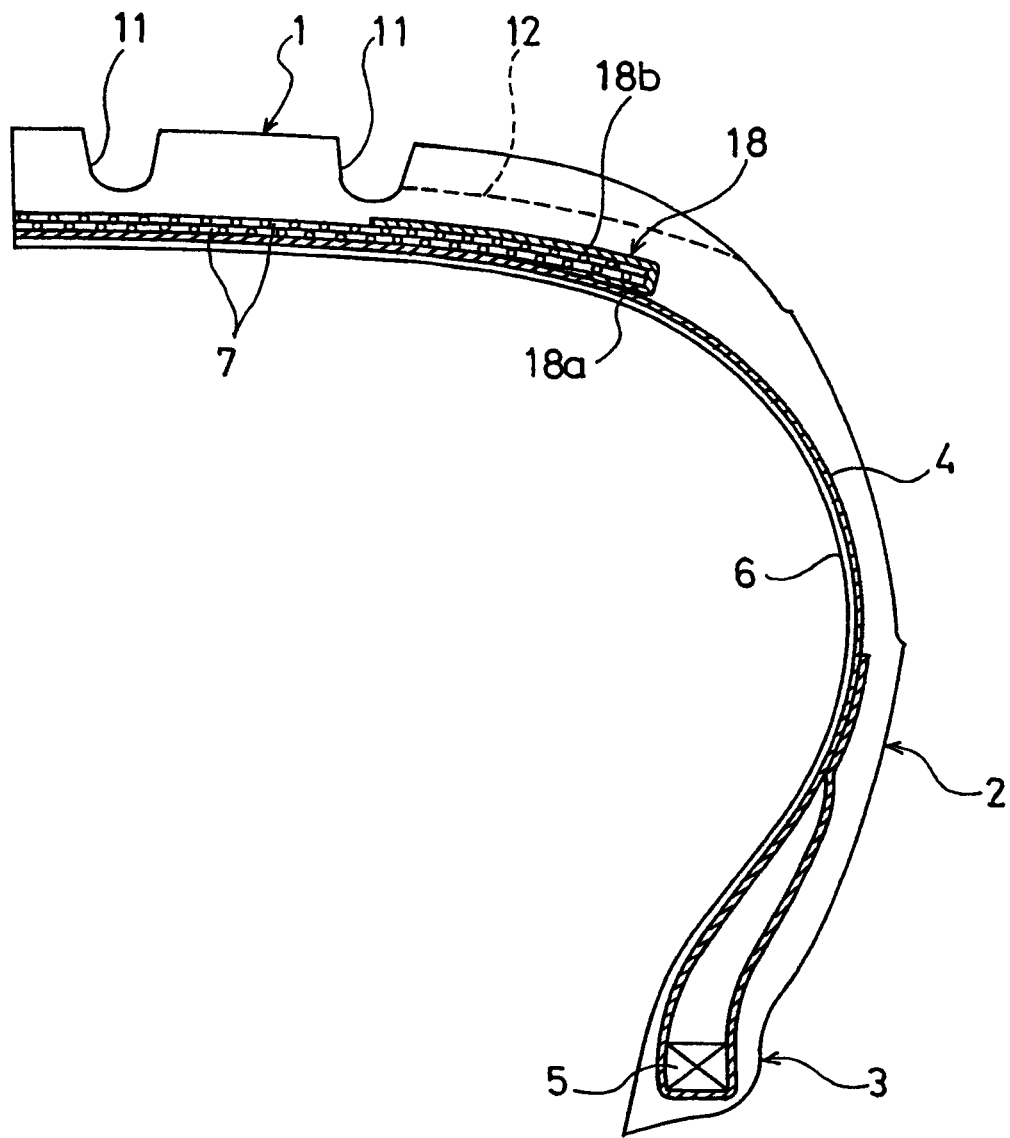
FIG. 4 is a meridian half cross-sectional view showing a pneumatic tire according to an embodiment of a second invention.

FIG. 4 shows a pneumatic tire according to an embodiment of a second invention. In FIG. 4, reference numeral 1 denotes a tread part, reference numeral 2 denotes sidewall parts, and reference numeral 3 denotes bead parts. A carcass layer 4 is laid between the pair of left and right bead parts 3 and 3. Each of the end portions of the carcass layer 4 is folded back around a bead core 5 from the inner side of the tire to the outer side thereof. An air permeation preventive layer 6 is disposed along the carcass layer 4, in the inner surface of the tire. The air permeation preventive layer 6 (inner liner layer) may be formed of a rubber composition primarily composed of polyisobutylene isoprene rubber. Alternatively, the air permeation preventive layer 6 may be formed of a thermoplastic resin, or a composition resin material obtained by dispersing an elastomer in a thermoplastic resin. Moreover, multiple belt layers 7 are disposed on the outer circumferential side of the carcass layer 4, in the tread part 1, and also over the entire circumference of the tire. These belt layers 7 include reinforcing cords each inclined to the circumferential direction of the tire, and are also disposed in such a manner that each reinforcing cord of one of the belt layers 7 intersects each reinforce cord of an adjacent one of the belt layers 7.

Figure 5:
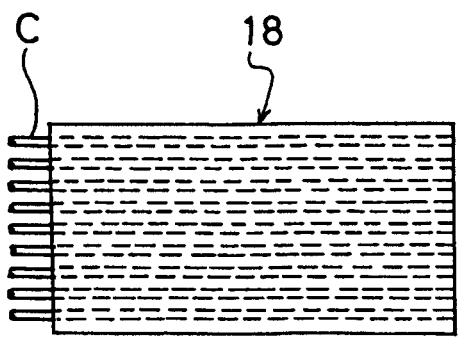
FIG. 5 is a plan view showing a part of a cord layer in the pneumatic tire of FIG. 4.

In the above-described pneumatic tire, a cord layer 18 is buried in the tread part 1 in such a manner that the cord layer 18 sandwiches the belt layers 7 from the inner side and the outer side, in the radial direction of the tire, of the belt layers 7. As shown in FIG. 5, as long as the cord layer 18 has a structure in which cords C are arranged in parallel, the cord angle of the cord layer 18 is not particularly limited. Moreover, the cord layer 18 may be covered with a rubber.

For example, the cord layer 18 may be formed by continuously winding one or multiple cords in the circumferential direction of the tire. Alternatively, the cord layer 18 may be formed of a calendered material which includes cords arranged in the width direction of the tire, and which has cut ends of the cords therein. As the cords of the cord layer 18, organic fiber cords made of nylon, polyester, polyethylene terephthalate, aramid, or the like, may be used, and alternatively, metal cords made of steel or the like may be used. In any case, each cord is formed by twisting at least three strands (filaments) in order to ensure the ventilation inside the cords.

An inner part 18a of the cord layer 18 is disposed between the carcass layer 4 and the belt layers 7. An outer part 18b of the cord layer 18 is disposed on the outer circumferential side of the belt layers 7, and along the belt layers 7. In addition, the cords of the cord layer 18 are continuously extended, in a straddling manner, between the inner part 18a and the outer part 18b. In other words, the cords of the cord layer 18 form a bypass for air, and the bypass continuously extends from the inner part 18a to the outer part 18b.

In the above-described pneumatic tire, the cord layer 18 is disposed in such a manner that the cord layer 18 sandwiches the belt layers 7 from the inner side and the outer side, in the radial direction of the tire, of the belt layers 7, and the cords of the cord layer 18 continuously extend, in a straddling manner, between the inner part 18a and the outer part 18b. Accordingly, in a process where air inside the tire permeates to the outside of the tire due to the difference in pressure between the inside and the outside of the tire, air moving toward the belt layers 7 is taken in the cords of the cord layer 18 before entering the belt layers 7. The air can thus be bypassed to the outer circumferential side of the belt layers 7. This structure makes it possible to reduce the amount of oxygen passing through the belt layers 7, and thus to suppress the oxidation degradation of the coating rubber of the belt layers 7. In this manner, the long-term durability of the pneumatic tire can be improved.

Moreover, the inner part 18a of the cord layer 18 is disposed between the carcass layer 4 and the belt layers 7, while the outer part 18b of the cord layer 18 is disposed on the outer circumferential side of the belt layers 7, along the belt layers 7. For this reason, the durability can be prevented from being reduced due to the cord layer 18. Specifically, the end portion of each of the inner part 18a and the outer part 18b of the cord layer 18 is disposed at a position with a small amount of deformation occurring. Accordingly, damage originating at the end portions of the cord layer 18 is unlikely to occur.

In the above-described pneumatic tire, the following effect can be obtained by extending each of the inner and outer parts 18a and 18b of the cord layer 18 to have an end portion located at a distance of not less than 10 mm from the edge portion of the belt layer 7 with the widest width to the tread center side. Specifically, this arrangement provides the effect of protecting the vicinity, where a separation failure is likely to occur, of the edge portion of the belt layers 7. If necessary, each of the inner and outer parts 18a and 18b may extend to the edge portion on the opposite side. However, it is preferable that the end portion of each of the inner and outer parts 18a and 18b of the cord layer 18 be located in a range from 10 mm to 40 mm, from the edge portion of the belt layer 7 with the widest width to the tread center side. This arrangement provides a sufficient effect of suppressing the oxidation degradation of the belt layers 7 while suppressing an increase in weight.

Figure 6:
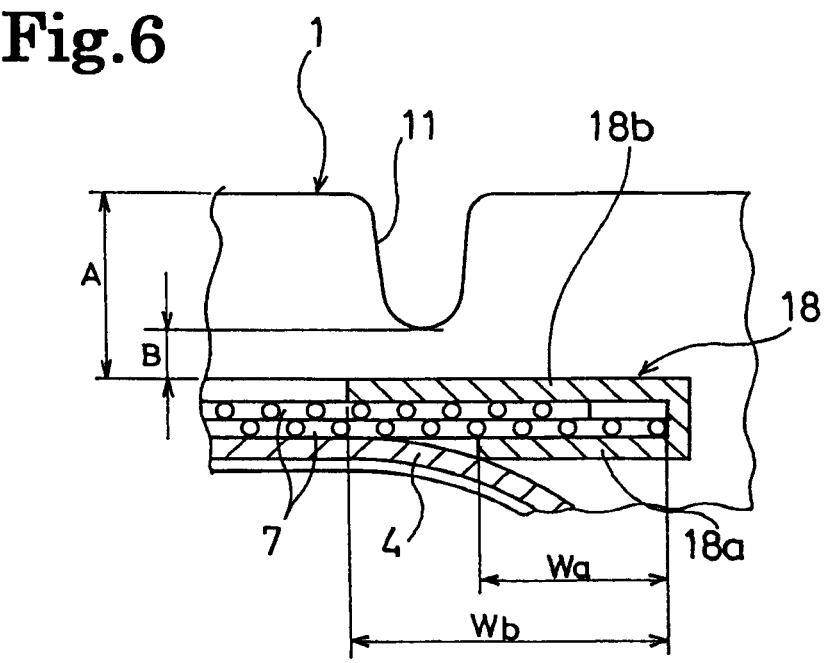
FIG. 6 is an enlarged cross-sectional view showing a chief part of the pneumatic tire of FIG. 4.

To be more specific, refer to the enlarged view of FIG. 6. An overlap amount Wa is preferably set in a range from 10 mm to 40 mm, where the overlap amount Wa corresponds to the distance, in the axial direction of the tire, from the end portion of the inner part 18a of the cord layer 18 to the edge portion of the belt layer 7 with the widest width. On the other hand, an overlap amount Wb is preferably set in a range from 10 mm to 40 mm, where the overlap amount Wb corresponds to the distance, in the axial direction of the tire, from the end portion of the outer part 18b of the cord layer 18 to the edge portion of the belt layer 7 with the widest width. When each of the overlap amounts Wa and Wb is less than 10 mm, the effect of protecting the vicinity of the edge portions of the belt layers 7 is insufficient. In contrast, when each of the overlap amounts Wa and Wb is more than 40 mm, the weight is significantly increased.

It is preferable that the outer part 18b of the cord layer 18 is extended so as to overlap a groove, such as a main groove 11 or a lug groove 12, which is formed in the tread part 1. By disposing the outer part 18b of the cord layer 18 in a region below the groove, such as the main groove 11 or the lug groove 12, formed in the tread part 1, air bypassed by the cord layer 18 can be effectively discharged to the outside of the tire from the groove part having a thin rubber gauge.

Here, the position where the outer part 18b overlaps a groove is a position where the groove and the outer part of the cord layer overlap at least partially each other when projected in a direction perpendicular to the tread surface. Consider a case, for example, where the cords of the cord layer 18 are arranged in the circumferential direction of the tire. In this case, it is preferable that the outer part 18b of the cord layer 18 extend so as to overlap a lug groove extending, in the width direction of the tire, in the shoulder region of the tread part. This allows the cords of the cord layer 18 to intersect the lug groove at multiple intersections. On the other hand, consider a case where the cords of the cord layer 18 are arranged in the width direction of the tire. In this case, it is preferable that the outer part 18b of the cord layer 18 extend so as to overlap a lug groove extending, in the width direction of the tire, in the shoulder region of the tread part, and also overlaps a main groove extending, in the circumferential direction of the tire, in the shoulder region. Note that, even when the outer part 18b of the cord layer 18 does not reach the position where the outer part 18b overlaps any groove, it is still possible to obtain the effect of bypassing air moving toward the belt layers 7.

In the case where the outer part 18b of the cord layer 18 extends to the position where the outer part 18b overlaps a groove, it is preferable, as shown in FIG. 6, that the relation between a tread gauge A and a groove-bottom gauge B at the position of the groove (main groove 11) be $0.03 \leq B/A \leq 0.5$. Here, the tread gauge A is a gauge from the tread surface to the cords of the cord layer 18, while the groove-bottom gauge B is a gauge from the bottom of the groove to the cords of the cord layer 18. When the ratio B/A is less than 0.03, cracking is likely to occur in the bottom of the groove. By contrast, when the ratio B/A exceeds 0.5, the effect of actively escaping air bypassed by the cord layer 18 cannot be obtained. For example, in the case of a tire for a passenger vehicle, it is desirable that the groove-bottom gauge B be set to be not less than 1.0 mm and not more than 2.7 mm. In the case of a heavy-duty tire used for a truck, a bus, or the like, it is desirable that the groove-bottom gauge B be set to be not less than 4.0 mm and not more than 6.5 mm.

The preferred embodiments of the present invention have been described so far. However, it is to be understood that various modifications, substitutions, and replacements may be made thereon without departing from the spirit and scope of the present invention defined by the scope of the attached claims.

EXAMPLE

Regarding the first invention, prepared were pneumatic tires of Conventional Example 1, Comparative Example 1, and Examples 1 to 3 with various tire structures different from one another. Each of these tires had a tire size of 195/65R15.

In the tire of Conventional Example 1, belt layers were buried on the outer circumferential side of a carcass layer in a tread part, while an air permeation preventive layer was provided in the inner surface of the tire. The tire of Comparative Example 1 had the same structure as that of Conventional Example 1 except the following points. Specifically, a cord layer was additionally provided in a buttress part to be laid between the carcass layer and the end portions of the belt layers. In addition, each end portion of the cord layer was located close to the outer surface of the tire at a height in a range from 0.7 H to 0.8 H, from the bead heel, in the radial direction of the tire, with respect to the cross-sectional height H of the tire. Here, the position of the end portion was also set so that the distance between the cords and the outer surface of the tire was 1 mm.

The tire of Example 1 had the same structure as that of Conventional Example 1 except the following points. Specifically, the end portion of the folded-back part of the carcass layer was located close to the outer surface of the tire at a height in a range from 0.1 H to 0.2 H, from the bead heel, in the radial direction of the tire, with respect to the cross-sectional height H of the tire. Here, the position of the end portion was set so that the distance between the cords and the outer surface of the tire was 1 mm. The tire of Example 2 had the same structure as that of Conventional Example 1 except the following points. Specifically, the end portion of the folded-back part of the carcass layer was located close to the outer surface of the tire at a height in a range from 0.3 H to 0.4 H, from the bead heel, in the radial direction of the tire, with respect to the cross-sectional height H of the tire. Moreover, the position of the end portion was set so that the distance between the cords and the outer surface of the tire was 1 mm. The tire of Example 3 has the same structure as that of Conventional Example 1 except the following points. Specifically, the end portion of a folded-back part of the carcass layer is located close to the outer surface of the tire at a height in a range from 0.4 H to 0.5 H, from the bead heel, in the radial direction of the tire, with respect to the cross-sectional height H of the tire. Moreover, the position of the end portion was set so that the distance between the cords and the outer surface of the tire was 1 mm.

A durability test and an air leakage test were performed on these test tires by the following test methods. The results of the tests are shown in Table 1.

Durability Test:

Each of the test tires was mounted on a wheel having a rim size of 15×6JJ, then inflated to an air pressure of 200 kPa. The tire and wheel are mounted on a passenger vehicle having an engine displacement of 1800 cc, and the vehicle was driven for 50,000 km on a paved road. After the driving, it is determined whether or not belt-edge separation or sidewall cracking occurred.

Air Permeation Test:

Each of the test tires was mounted on a wheel having a rim size of 15×6JJ, and then left for three months, with an initial air pressure of 250 kPa, at room temperature of 21° C., and under a no-load condition. During the test, the pressure was measured at predetermined measurement intervals. The internal pressure was measured at every three hours, and a value α was obtained by regression from the following equation (1) where Pt, P0, and t represent a measured pressure, the initial pressure, and the number of days elapsed, respectively.

$$Pt/P0 = \exp(-\alpha t) \quad (1)$$

Then, a value β was obtained from the following equation (2) by using the value α obtained from the equation (1), and concurrently by assigning 30 (days) to the value t.

$$\beta = [1 - \exp(-\alpha t)] \times 100 \quad (2)$$

The value β thus obtained was taken as a rate of decrease in pressure per month (%/month).

TABLE 1

|  |  | Conventional Example 1 | Comparative Example 1 | Example 1 | Example 2 | Example 3 |
|---|---|---|---|---|---|---|
| Close Part of Codes to Outer Surface of Tire | | — | 0.7H to 0.8H | 0.1H to 0.2H | 0.3H to 0.4H | 0.4H to 0.5H |
| Result of Durability Test | Belt-edge Separation | Present | Absent | Absent | Absent | Absent |
| | Sidewall Cracking | Absent | Present | Absent | Absent | Absent |
| Result of Air Leakage Test (%/Month) | | 3.03 | 3.05 | 3.01 | 3.04 | 3.06 |

As shown in Table 1, in each of the tires of Examples 1 to 3, neither belt-edge separation nor sidewall cracking had occurred when the durability test was completed. Each of these tires also showed an excellent result of the air leakage test. On the other hand, in the tire of Conventional Example 1, belt-edge separation had occurred. In addition, in the tire of Comparative Example 1, belt-edge separation was prevented from occurring, but sidewall cracking had occurred instead.

Next, regarding the second invention, prepared were pneumatic tires of Conventional Example 11, Comparative Examples 11 and 12, as well as Examples 11 and 12 with various tire structure different from one another. Each of these tires had a tire size of 195/65R15.

In the tire of Conventional Example 11, belt layers were buried on the outer circumferential side of a carcass layer in a tread part. The tire of Comparative Example 11 had the same structure as that of Conventional Example 11 except the following points. Specifically, a cord layer was formed by arranging Nylon multifilament cords of 840 denier at an angle of 90° to the circumferential direction of the tire. An inner part of the cord layer was disposed between the carcass layer and the belt layers, while an outer part of the cord layer was disposed on the outer circumferential side of the belt layers, along the belt layers. The cords of the cord layer were non-continuous between the inner part and the outer part. The tire of Comparative Example 12 had the same structure as that of Conventional Example 11 except the following points. Specifically, a cord layer was formed by arranging Nylon multifilament cords of 840 denier at an angle of 90° to the circumferential direction of the tire. The cord layer was then disposed between the carcass layer and the end portions of the belt layers in the buttress part. In addition, the end portion of the cord layer was located close to the outer surface of the tire so that the distance between the cords and the outer surface of the tire was 1 mm.

The tire of Example 11 had the same structure as that of Conventional Example 11 except the following points. Specifically, a cord layer was formed by arranging Nylon multifilament cords of 840 denier at an angle of 90° to the circumferential direction of the tire. In addition, an inner part of the cord layer was disposed between the carcass layer and the belt layers, while an outer part of the cord layer was disposed on the outer circumferential side of the belt layers, along the belt layers. Moreover, the cords of the cord layer were continuously extended, in a straddling manner, between the inner part and the outer part of the cord layer. The tire of Example 12 had the same structure as that of Conventional Example 11 except the following points. Specifically, a cord layer was formed by arranging Nylon multifilament cords of 840 denier at an angle of substantially 0° to the circumferential direction of the tire. In addition, an inner part of the cord layer was disposed between the carcass layer and the belt layers, while an outer part of the cord layer was disposed on the outer circumferential side of the belt layers, along the belt layers. Moreover, the cords of the cord layer were continuously extended, in a straddling manner, between the inner part and the outer part of the cord layer. Note that, each of these above dimensions is shown in Table 2.

A durability test was performed on these test tires by the following test method. The results of the test are shown in Table 2.

Durability Test:

Each of the test tires was mounted on a wheel having a rim size of 15×6JJ, then inflated to an air pressure of 200 kPa. The tire and wheel are mounted on a passenger vehicle having an engine displacement of 1800 cc, and the vehicle was driven for 80,000 km on a paved road. After the driving, it is determined whether or not belt-edge separation or sidewall cracking occurred.

TABLE 2

|  | Conventional Example 11 | Comparative Example 11 | Comparative Example 12 | Example 11 | Example 12 |
|---|---|---|---|---|---|
| Presence or Absence of Cord Layer | Absent | Present | Present | Present | Present |
| Alignment of Codes of Cord Layer | — | Width Direction of Tire | Width Direction of Tire | Width Direction of Tire | Circumferential Direction of Tire |
| Bypass of Cords of Cord Layer | — | Non-continuous | — | Continuous | Continuous |
| Overlap Amount Wa of Cord Layer | — | 10 mm | 10 mm | 10 mm | 10 mm |
| Overlap Amount Wb of Cord Layer | — | 10 mm | — | 10 mm | 10 mm |
| Groove-bottom Gauge B/Tread Gauge A | — | 0.25 | — | 0.25 | 0.25 |
| Presence or Absence of Overlap of Cord Layer and Groove | — | Present | — | Present | Present |
| Result of Durability Test — Belt-edge Separation | Present | Present | Absent | Absent | Absent |
| Result of Durability Test — Sidewall Failure | Absent | Absent | Present | Absent | Absent |

As shown in Table 2, in each of the tires of Examples 11 and 12, neither belt-edge separation nor sidewall failure had occurred when the durability test was completed. On the other hand, in each of the tires of Conventional Example 11 and Comparative Example 11, belt-edge separation had occurred. In addition, in the tire of Comparative Example 12, belt-edge separation was prevented from occurring, but cracking had occurred in the outer surface of the tire, near the end portion of the cord layer.

What is claimed is:

1. A pneumatic tire comprising:
   an air permeation preventive layer disposed in the inner surface of the tire;
   a belt layer buried in a tread part;
   a single carcass layer defining two end portions laid between a pair of bead parts, wherein each of the end portions of the single carcass layer are folded around a bead core of one of the bead parts from an inner side of the tire to an outer side of the tire; and
   a cord layer formed by arranging a plurality of cords, the cord layer being disposed between the air permeation preventive layer and the belt layer along the single carcass layer, and extending radially inwardly to a respective bead part side further from a tire maximum width position to a termination point outward of the radial height of either of the bead cores without including any portion that extends radially inwardly to reach an area radially aligned with a bead core of the respective bead part side,
   wherein a part of the cord layer is located close to the outer surface of the tire, at a position closer to the respective bead part side than the tire maximum width position, so that the distance between the cords and the outer surface of the tire is not more than 2 mm,
   wherein radially inward of the tire maximum width position a portion of the cord layer is in contact with the respective folded end portion of the single carcass layer,
   wherein the single carcass layer is in contact with both the air permeation preventive layer and the cord layer, and
   wherein radially inward of the tire maximum width position the portion of the cord layer in contact with the respective folded end portion of the single carcass layer is extended radially inwardly by a respective portion of the cord layer which simultaneously extends closer to the outer surface of the tire and farther from the carcass layer and the respective portion of the cord layer which simultaneously extends closer to the outer surface of the tire and farther from the carcass layer is extended radially inwardly by the respective part of the cord layer located close to the outer surface of the tire.

2. The pneumatic tire according to claim 1, wherein the cord layer is a pair of cord layers, with each of said pair of cord layers overlapping a respective end portion of the belt layer and the overlapping width, in the axial direction of the tire, of the respective cord layer and the belt layer is set at least 10 mm from the respective end portion of the belt layer.

3. The pneumatic tire according to claim 1, wherein the cord layer extends from one side of the tire, under the belt layer, and to the other side of the tire.

4. The pneumatic tire according to claim 1, wherein the part of the cord layer close to the outer surface of the tire; is located at a height in a range from 0.1 H to 0.5 H, from a bead heel, in the radial direction of the tire, with respect to the cross-sectional height H of the tire.

5. The pneumatic tire according to claim 4, wherein the cord layer is a pair of cord layers, with each of said pair of cord layers overlapping a respective end portion of the belt layer and the overlapping width, in the axial direction of the tire, of the respective cord layer and the belt layer is set at least 10 mm from the respective end portion of the belt layer.

6. The pneumatic tire according to claim 4, wherein the cord layer extends from one side of the tire, under the belt layer, and to the other side of the tire.

* * * * *